United States Patent
Lapp et al.

(10) Patent No.: US 12,042,756 B2
(45) Date of Patent: Jul. 23, 2024

(54) VEHICLE AIR FILTER HOUSING WITH INTEGRATED BROAD BAND TUNER

(71) Applicant: Toledo Molding & Die, LLC, Toledo, OH (US)

(72) Inventors: Jeffrey David Lapp, Holland, OH (US); Nicholas Todd Konarski, Attica, MI (US)

(73) Assignee: Toledo Molding & Die, LLC, Toledo, OH (US)

( * ) Notice: Subject to any disclaimer, the term of this patent is extended or adjusted under 35 U.S.C. 154(b) by 193 days.

(21) Appl. No.: 17/375,612

(22) Filed: Jul. 14, 2021

(65) Prior Publication Data

US 2022/0016561 A1 Jan. 20, 2022

Related U.S. Application Data

(60) Provisional application No. 63/051,452, filed on Jul. 14, 2020.

(51) Int. Cl.
*B01D 46/00* (2022.01)
*B01D 46/10* (2006.01)
(Continued)

(52) U.S. Cl.
CPC ......... *B01D 46/10* (2013.01); *B01D 46/0005* (2013.01); *B01D 46/521* (2013.01); *B01D 2271/022* (2013.01); *B01D 2279/60* (2013.01)

(58) Field of Classification Search
CPC .............. B01D 46/10; B01D 2271/022; B01D 2279/60; F02M 35/14; F02M 35/0201;
(Continued)

(56) References Cited

U.S. PATENT DOCUMENTS 5,979,598 A * 11/1999 Wolf .................. F02M 35/1216
181/272
6,105,547 A  8/2000 Sakamoto et al.
(Continued)

FOREIGN PATENT DOCUMENTS

CN  104061095  9/2014
CN  113047986 A * 6/2021 ............. F02M 35/14
(Continued)

*Primary Examiner* — Minh Chau T Pham
(74) *Attorney, Agent, or Firm* — McHale & Slavin, P.A.

(57) ABSTRACT

A vehicle air filter housing having a broad band tuner. The housing is formed from a tray having a divider wall defining an unfiltered air induction chamber and a tuner chamber. A cover securable to the tray includes a second divider wall defining a filtered air chamber and a flow path chamber. A filter member provides a seal between the tray and the cover, and holds an air filter between the unfiltered air chamber and the filtered air chamber. A plate securable to the flow path chamber has a plurality of perforations. Air inducted through the inlet passes through the air filter and flows through the flow path chamber at a velocity whereby the filtered air passes over the perforated plate and predetermined frequencies pass through the plate perforations for attenuation in the tuner chamber. The tuners in the tuner chamber may be sized to attenuate different frequencies.

17 Claims, 3 Drawing Sheets

(51) Int. Cl.
*B01D 46/52* (2006.01)
*F02M 35/02* (2006.01)
*F02M 35/024* (2006.01)
*F02M 35/12* (2006.01)
*F02M 35/14* (2006.01)

(58) Field of Classification Search
CPC ......... F02M 35/0204; F02M 35/02491; F02M 35/1216; F02M 35/1266
USPC ........ 55/385.3; 96/380, 383–388; 123/198 E
See application file for complete search history.

(56) References Cited

U.S. PATENT DOCUMENTS

| | | | | |
|---|---|---|---|---|
| 6,205,968 | B1 * | 3/2001 | Spannbauer | F02M 35/1266 123/184.57 |
| 6,328,011 | B1 * | 12/2001 | Jessberger | F02M 35/10301 123/184.57 |
| 6,783,579 | B2 * | 8/2004 | Pettipiece | B01D 46/10 96/384 |
| 6,802,388 | B2 | 10/2004 | Wolf et al. | |
| 7,141,101 | B2 * | 11/2006 | Amann | B01D 46/4236 55/497 |
| 7,631,726 | B2 | 12/2009 | McWilliam et al. | |
| 8,562,726 | B2 * | 10/2013 | Jun | F02M 35/02491 55/420 |
| 9,970,351 | B2 * | 5/2018 | Zuroski | F02B 77/13 |
| 11,168,653 | B2 * | 11/2021 | Stankavich | B01D 46/444 |
| 2003/0041832 | A1 * | 3/2003 | Kodweiss | F02B 75/243 123/184.53 |
| 2004/0069563 | A1 | 4/2004 | Zirkelbach | |
| 2005/0224036 | A1 * | 10/2005 | Arevalo | F02M 35/14 96/87 |
| 2009/0178879 | A1 * | 7/2009 | Park | F02M 35/1272 181/224 |

FOREIGN PATENT DOCUMENTS

| | | | |
|---|---|---|---|
| DE | 10058479 | 5/2002 | |
| DE | 102017130661 | 6/2019 | |
| DE | 102021128686 A1 * | 5/2023 | ............. F02M 35/14 |
| EP | 1403506 | 3/2004 | |
| FR | 3073012 | 5/2019 | |
| KR | 19982256246 | 9/1998 | |

* cited by examiner

VEHICLE AIR FILTER HOUSING WITH INTEGRATED BROAD BAND TUNER

In accordance with 37 C.F.R. § 1.76, a claim of priority is included in an Application Data Sheet filed concurrently herewith. Accordingly, the present invention claims priority to U.S. Provisional Patent Application No. 63/051,452, entitled "VEHICLE AIR FILTER HOUSING WITH INTEGRATED BROAD BAND TUNER" filed Jul. 14, 2020. The contents of the above referenced application are incorporated herein by reference.

FIELD OF THE INVENTION

The present invention relates generally to vehicle airflow systems and, more particularly, to a vehicle air filter housing with an integrated broad band tuner.

BACKGROUND OF THE INVENTION

Vehicles with internal combustion engines are known to generate a high sound as a result of air being inducted into the engine. The sound is especially objectionable if it resonates at a high frequency, such as that commonly produced by a turbocharged engine, which is known to generate a high frequency turbo sound in the form of a hiss from around 0.8-20 kHz.

Specifically positioned insulation and/or noise resonators are known prior art, but the failure of such techniques to address many of the frequencies is amongst some of the reasons such techniques fail. Conventional resonators, such as Helmholtz, Expansion Chamber, and Quarter Wave Tuners are unable to target high frequencies.

The use of an inline silencer may lead to a higher restriction penalty since the reactive silencing components are required to be placed directly in the path of maximum flow. Packaging space is also inadequate when trying to fit an inline silencer targeting multiple octave bands in the high frequency regime because of limits imposed by available space and suitable duct lengths. Typical designs will also be limited by manufacturing feasibility when targeting above 12.0 kHz due to difficulties in forming such large numbers of closely spaced, short, and small diameter holes in solid, molded plastic components. The prior art, as noted above, tends to be very heavy, complex, and expensive. Accordingly, very few production examples of these technologies are used in practice, owing to their weight and cost to implement.

Prior art, such as that disclosed in U.S. Pat. No. 6,802,388, is directed to a noise damper for pipelines carrying noise laden gases for the intake or outtake of an internal combustion engine. The device employs a plurality of diaphragm rings having an outside surface in communication with the inside surface of the outside pipe and at least one insert having an outside surface in communication with either the inside surface of the outside pipe and/or one of the diaphragm rings.

U.S. Pat. No. 7,631,726 attempts to target higher frequencies and broader bandwidths, having an acoustic interference member disposed within a conduit. The acoustic absorbing member converts noise energy within the conduit into heat energy to attenuate noise energy within the air induction silencer assembly.

What is lacking in the industry is an air filter having an integrated broad band tuner that provides frequency attenuation without inhibiting air flow.

SUMMARY OF THE INVENTION

An air filter housing having a broad band tuner. The housing is formed from a tray having a continuous sidewall with a support edge and a divider wall defining an unfiltered air induction chamber and a tuner chamber; the induction chamber having an air inlet, and the tuner chamber having a plurality of tuners. A cover is securable to the tray having a continuous sidewall support edge with a divider wall, defining a filtered air chamber and a flow path chamber, the flow path chamber having an air outlet extending through the cover.

A filter member provides a seal between the tray and the cover, and holds an air filter between the unfiltered air chamber and the filtered air chamber. A plate is securable to the flow path chamber, having a plurality of perforations wherein air inducted through the inlet passes through the air filter and flows through the flow path chamber at a velocity whereby the filtered air passes over the perforated plate and the tuner chamber attenuates certain frequencies that have passed through the perforations. Tuners within the tuner chamber are each designed to address a particular frequency range.

An objective of the invention is to provide a vehicle air filter having an integrated broad band high frequency tuner.

Another objective of the invention is to teach the use of a single piece perforated plate forming an air flow path that allows for attenuation of certain frequencies passing through the plate and uninhibited air flow passage.

Still another objective is to teach the use of a "D" shaped flow path to reduce manufacturing costs and provide a tuning volume that can be separated to provide attenuation for certain frequencies and help target different attenuation bands.

Still another objective of the invention is to provide an air filter housing with an integrated broad band tuner that is inexpensive to manufacture, which consists of a tray, a cover, a perforated flow path plate, and a replaceable filter element.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
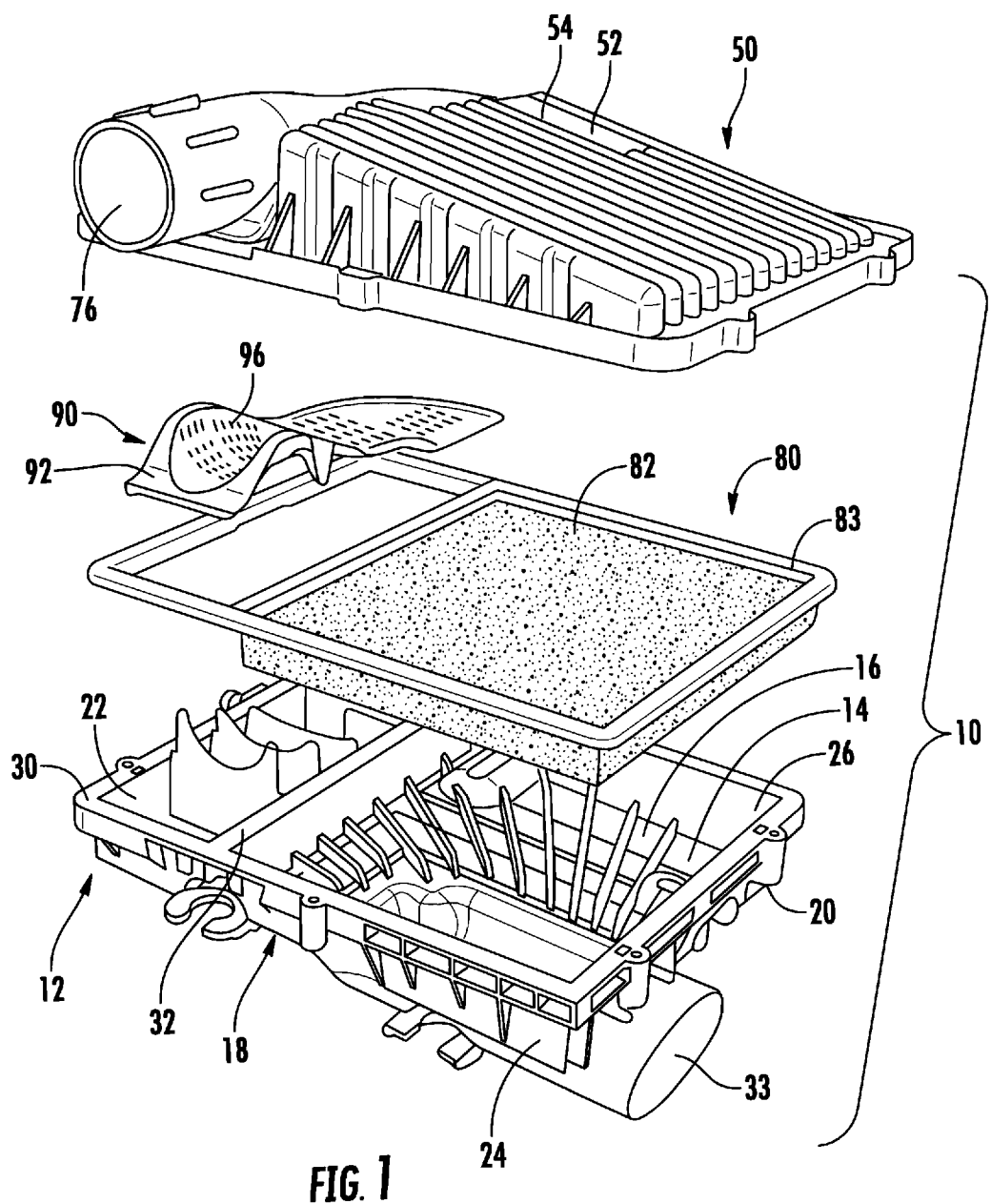
FIG. 1 is an exploded view of the vehicle air filter housing with integrated broad band tuner.
Figure 2:
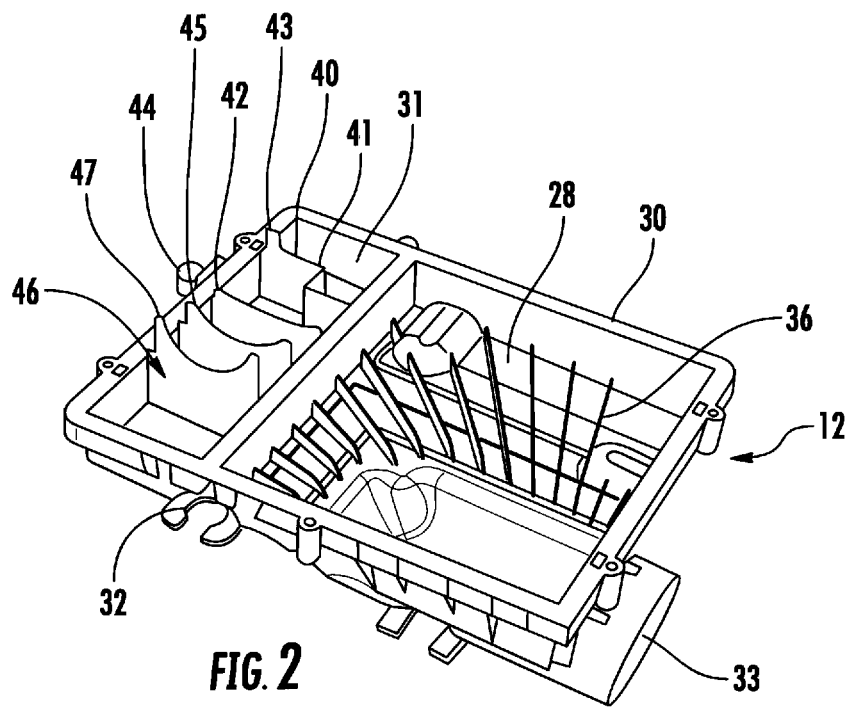
FIG. 2 is a perspective top view of the tray with tuning chamber.
Figure 3:
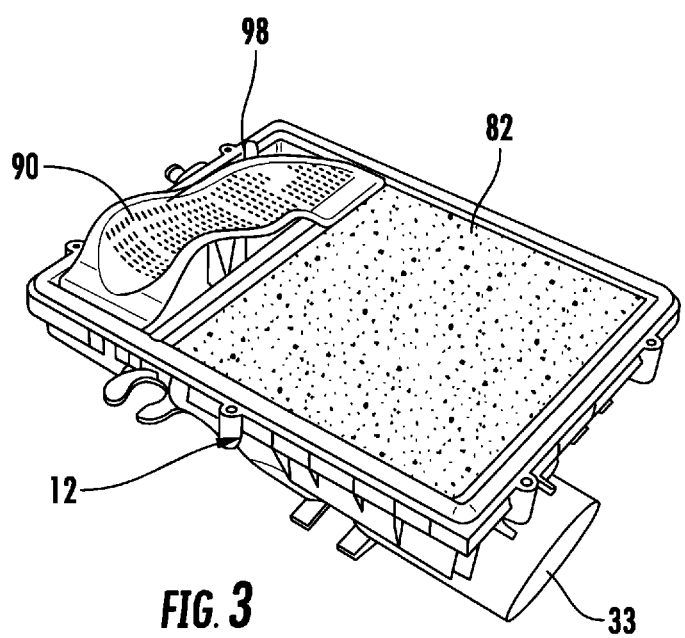
FIG. 3 is a perspective top view of the tray with filter element.
Figure 4:
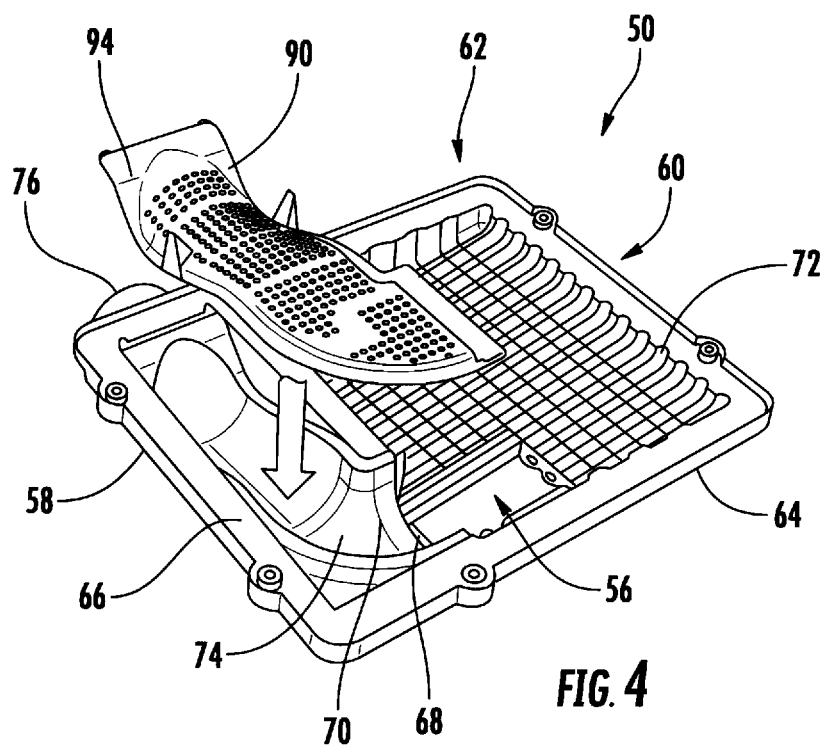
FIG. 4 is a perspective bottom view of the cover with detached plate.
Figure 5:
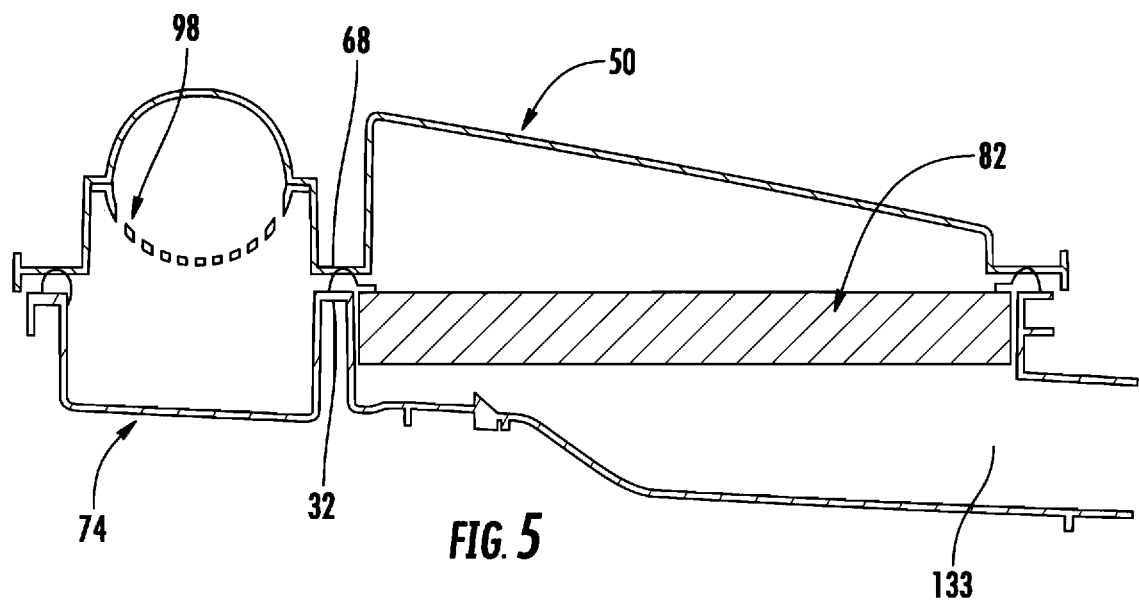
FIG. 5 is a pictorial side view of the vehicle air filter housing.

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring to the figures in general, set forth is the air filter housing 10 having a broad band tuner. The housing is formed from a tray 12 having a bottom wall 14 with an upper surface 16 and a lower surface 18; the upper surface 16 having a first end wall 20, a second end wall 22, a first side wall 24, and a second side wall 26 extending upwardly from the bottom wall 14, forming a first continuous sidewall support edge 30. A lower divider wall 32 extends between the first side wall 24 and the second side wall 26, defining an unfiltered air induction chamber 28 and a tuner chamber 31. The induction chamber 28 has an air inlet 33 extending through the bottom wall 14; the bottom wall 14 including a plurality of reinforcement fins 36, allowing the use of a thinner tray wall. The fins 36 further provide directional flow of induced air. The tuning chamber 31 has a series of tuners 40,42,44,46 each of a shape calculated to attenuate a frequency range. By way of example, a first tuner employs a right angle shape with a flat upper edge 41; a second tuner 42 employs a straight shape with a minimally curved upper edge 43; a third tuner 44 employs a straight shape with an enhanced curved upper edge 45; and a fourth tuner 46 employs a straight shape with a pronounced curved upper edge 47. Adding broad band tuners into the air filter housing provides a large volume for multiple tuners. The tuners 40,42,44,46 can be designed so that their cumulative effect is greater than each individual tuner. Placing these tuners in the air cleaner housing allows for them to be separated by a standing wall. This turns valuable package space into more tuning volume. Each tuner is constructed and arranged to target a frequency range. The tuners operate in conjunction with the perforated plate to provide acoustic tuning and can target octave bands. In this embodiment, the tuners form five tuning volumes. Additional tuning volumes, or less tuning volumes, are considered within the scope of this invention.

A cover 50 has a top wall 52 with an outer surface 54 and an inner surface 56; the inner surface 56 having a first end wall 58, a second end wall 60, a first side wall 62, and a second side wall 64 extending downwardly therefrom, forming a second continuous sidewall support edge 66. An upper divider wall 68 extends between the first side wall 62 to the second side wall 64 of the cover 50 with a channel 70 forming a filtered air chamber 72 and a flow path chamber 74; the flow path chamber 74 having an air outlet 76 extending through the top wall 52.

A filter member frame 80 is constructed and arranged to provide a seal between the first continuous sidewall support edge 30 and the second continuous sidewall support edge 66, and extend between the upper divider wall 68 and lower divider wall 32. The filter member frame 80 includes a rim frame 83 constructed of polyurethane to provide a flexible seal with an air filter 82 secured thereto. The air filter 82 is positioned between the unfiltered air induction chamber 28 and the filtered air chamber 72.

A plate 90 has an upper surface 92 securable to the flow path chamber 74 and a lower surface 94 operatively associated with the tuner chamber 31; the shape of the plate 90 conforming to the tuners employed. The plate 90 includes a plurality of perforations 96 therethrough. The perforations 96 are of a size and shape wherein the velocity of air inducted through the flow path chamber 74 does not pass through the perforations 96; rather the perforations 96 are constructed and arranged to allow certain frequencies passing through the perforations 96 to be attenuated by the tuners. The plate 90 includes a plurality of tabs 98, allowing the plate 90 to snap secure to the cover 50.

Traditionally, the tuning volume is concentric with a flow path. Applicant's use of a "D" shaped flow path allows one less piece to form the flow path when compared to a concentric design, the flat portion of the "D" cross-section sealing on the clean side of the filter. This feature continues the separation between the clean and dirty sides of the housing. Second, the single piece snaps into place, separating the flow path from the tuning volume. This eliminates a weld process that is required to bond a two piece concentric design together. Third, because of its simplicity, a lower cost is achieved due to less tooling and processing.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

What is claimed is:

1. A vehicle air filter housing with an integrated broad band tuner comprising:
   a tray having a bottom wall with an upper surface and a lower surface, said upper surface having a first end wall, a second end wall, a first side wall, and a second side wall extending upwardly therefrom, forming a first continuous sidewall support edge, a lower divider wall extending between said first side wall and said second side wall of said tray defining an unfiltered air induction chamber and a tuner chamber, said induction chamber having an air inlet extending through said bottom wall, said tuner chamber having a first tuner constructed and arranged to amend a first frequency range followed by a second tuner constructed and arranged to amend a second frequency range, each tuner is constructed and arranged to target a distinct frequency range;

a cover having a top wall with an outer surface and an inner surface, said inner surface having a first end wall, a second end wall, a first side wall, and a second side wall extending downwardly therefrom, forming a second continuous sidewall support edge, an upper divider wall extending between said first side wall and said second side wall of said cover, defining a filtered air chamber and a flow path chamber, said flow path chamber having an air outlet extending through said top wall;

a filter member frame constructed and arranged to provide a seal between said first continuous sidewall support edge and said second continuous sidewall support edge and extending between said upper and lower divider walls, said filter member frame including an air filter secured thereto, said air filter positioned between said unfiltered air chamber and said filtered air chamber; and a plate having an upper surface securable to said flow path chamber and a lower surface operatively associated with said tuner chamber, said plate having a plurality of perforations therethrough;

wherein air inducted through said inlet passes through said air filter and flows through said flow path chamber at a velocity whereby the filtered air passes over said perforated plate and said tuner chamber attenuates certain frequencies passing through said perforations.

2. The vehicle air filter housing with an integrated broad band tuner according to claim 1 wherein said tuners operate in conjunction with said perforated plate to provide acoustic tuning.

3. The vehicle air filter housing with an integrated broad band tuner according to claim 1 wherein said first tuner, said second tuner, a third tuner and a fourth tuner are positioned in said tuner chamber and operate in conjunction with said perforated plate to provide acoustic tuning.

4. The vehicle air filter housing with an integrated broad band tuner according to claim 3 wherein each said tuner is constructed and arranged to target different attenuation bands.

5. The vehicle air filter housing with an integrated broad band tuner according to claim 1 wherein said plate allows an unrestricted flow of air from said filtered air chamber to said air outlet.

6. The vehicle air filter housing with an integrated broad band tuner according to claim 1 wherein said filter member frame rim is polyurethane.

7. The vehicle air filter housing with an integrated broad band tuner according to claim 1 wherein a first tuner employs a right angle shape with a flat upper edge.

8. The vehicle air filter housing with an integrated broad band tuner according to claim 1 wherein a second tuner employs a straight shape with a minimally curved upper edge.

9. The vehicle air filter housing with an integrated broad band tuner according to claim 1 wherein a third tuner employs a straight shape with an enhanced curved upper edge.

10. The vehicle air filter housing with an integrated broad band tuner according to claim 1 wherein a fourth tuner employs a straight shape with a pronounced curved upper edge.

11. The vehicle air filter housing with an integrated broad band tuner according to claim 1 wherein said tuners are constructed and arranged to amend the high frequency turbo sound that forms a hiss from around 0.8 kHz to 20 kHz in a turbocharged engine.

12. A vehicle air filter housing with an integrated broad band tuner comprising:

a tray having a bottom wall with an upper surface and a lower surface, said upper surface having a first end wall, a second end wall, a first side wall, and a second side wall extending upwardly therefrom, forming a first continuous sidewall support edge, a lower divider wall extending between said first side wall and said second side wall of said tray defining an unfiltered air induction chamber and a tuner chamber, said induction chamber having an air inlet extending through said bottom wall, said tuner chamber having at least a first tuner constructed and arranged to amend a first frequency range followed by a second tuner constructed and arranged to amend a second frequency range, followed by a third tuner constructed and arranged to amend a third frequency range, followed by a fourth tuner constructed and arranged to amend a fourth frequency range said frequency range between 0.8 kHz and 20 kHz;

a cover having a top wall with an outer surface and an inner surface, said inner surface having a first end wall, a second end wall, a first side wall, and a second side wall extending downwardly therefrom, forming a second continuous sidewall support edge, an upper divider wall extending between said first side wall and said second side wall of said cover, defining a filtered air chamber and a flow path chamber, said flow path chamber having an air outlet extending through said top wall;

a filter member frame constructed and arranged to provide a seal between said first continuous sidewall support edge and said second continuous sidewall support edge and extending between said upper and lower divider walls, said filter member frame including an air filter secured thereto, said air filter positioned between said unfiltered air chamber and said filtered air chamber; and a plate having an upper surface securable to said flow path chamber and a lower surface operatively associated with said tuner chamber, said plate having a plurality of perforations therethrough;

wherein air inducted through said inlet passes through said air filter and flows through said flow path chamber at a velocity whereby the filtered air passes over said perforated plate and said tuner chamber attenuates certain frequencies passing through said perforations.

13. The vehicle air filter housing with an integrated broad band tuner according to claim 12 wherein said tuner chamber includes additional tuners, wherein each tuner is constructed and arranged to target a distinct frequency range.

14. The vehicle air filter housing with an integrated broad band tuner according to claim 12 wherein said first tuner employs a right angle shape with a flat upper edge.

15. The vehicle air filter housing with an integrated broad band tuner according to claim 12 wherein said second tuner employs a straight shape with a minimally curved upper edge.

16. The vehicle air filter housing with an integrated broad band tuner according to claim 12 wherein said third tuner employs a straight shape with an enhanced curved upper edge.

17. The vehicle air filter housing with an integrated broad band tuner according to claim 12 wherein said fourth tuner employs a straight shape with a pronounced curved upper edge.

* * * * *